US008054750B2

(12) United States Patent
Claise et al.

(10) Patent No.: US 8,054,750 B2
(45) Date of Patent: Nov. 8, 2011

(54) VIRTUAL RESPONDER FOR THE AUTO-DISCOVERY OF A REAL RESPONDER IN A NETWORK PERFORMANCE TEST

(75) Inventors: Benoit Claise, Crisnee (BE); Emmanuel Tychon, Fexhe-le-Haut-Clocher (BE)

(73) Assignee: Cisco Technology, Inc., San Jose, CA (US)

( * ) Notice: Subject to any disclaimer, the term of this patent is extended or adjusted under 35 U.S.C. 154(b) by 334 days.

(21) Appl. No.: 11/874,799

(22) Filed: Oct. 18, 2007

(65) Prior Publication Data

US 2009/0103449 A1 Apr. 23, 2009

(51) Int. Cl.
*G01R 31/08* (2006.01)
*G06F 11/00* (2006.01)
*G08C 15/00* (2006.01)
*H04J 1/16* (2006.01)
*H04J 3/14* (2006.01)
*H04L 1/00* (2006.01)
*H04L 12/26* (2006.01)

(52) U.S. Cl. ........ 370/241; 370/217; 370/218; 370/219; 370/220; 370/249; 370/252; 370/253; 370/346; 709/223

(58) Field of Classification Search .................. None
See application file for complete search history.

(56) References Cited

U.S. PATENT DOCUMENTS

| | | | |
|---|---|---|---|
| 6,597,689 B1 * | 7/2003 | Chiu et al. ............ | 370/354 |
| 6,662,223 B1 | 12/2003 | Zhang et al. | |
| 6,868,094 B1 | 3/2005 | Bordonaro et al. | |
| 6,925,062 B2 * | 8/2005 | Tanaka et al. .......... | 370/241.1 |
| 7,154,858 B1 * | 12/2006 | Zhang et al. .......... | 370/252 |
| 7,159,026 B2 * | 1/2007 | Lau et al. ............. | 709/226 |
| 7,284,051 B1 * | 10/2007 | Okano et al. .......... | 709/226 |
| 2004/0006615 A1 * | 1/2004 | Jackson ............... | 709/223 |
| 2005/0122983 A1 * | 6/2005 | Gilmartin et al. ...... | 370/395.53 |
| 2007/0189180 A1 * | 8/2007 | Schelen et al. ........ | 370/252 |
| 2007/0268882 A1 * | 11/2007 | Breslau et al. ........ | 370/346 |
| 2008/0186854 A1 * | 8/2008 | Farrimond et al. ..... | 370/235 |

* cited by examiner

*Primary Examiner* — Salman Ahmed
*Assistant Examiner* — Peter Chau
(74) *Attorney, Agent, or Firm* — Fish & Richardson P.C.

(57) ABSTRACT

Particular embodiments provide a virtual responder that can be contacted by any number of senders. When a sender wants to perform a measurement test with a real responder, the sender sends a control message to a virtual responder. The virtual responder is configured to determine a real responder based on real responder selection metrics. The virtual responder may poll the real responders at certain times to receive the real responder selection metrics. The virtual responder then selects a real responder from a plurality of real responders based on the real responder's selection metrics. The virtual responder then sends contact information for the selected real responder to the sender device. This allows the sender device to contact the selected real responder to perform the measurement test with a real responder.

21 Claims, 5 Drawing Sheets

VIRTUAL RESPONDER FOR THE AUTO-DISCOVERY OF A REAL RESPONDER IN A NETWORK PERFORMANCE TEST

TECHNICAL FIELD

Particular embodiments generally relate to networking.

BACKGROUND

Some network applications, such as a virtual private network (VPN) application, voice over Internet protocol (VoIP) applications, streaming video, etc., may experience packet delay and/or jitter. An Internet service provider (ISP) may provide service-level agreements (SLAs) to a client. The service level agreements specify a certain guaranteed level of service. Packet delay and/or jitter may affect the network performance and thus the SLAs. The ISP needs a way to measure the network performance to ensure that the client is receiving the level of service that was agreed upon in the service-level agreement.

DESCRIPTION OF EXAMPLE EMBODIMENTS

Overview

Particular embodiments provide a virtual responder that can be contacted by any number of senders. When a sender wants to perform a measurement test with a real responder, the sender sends a control message to a virtual responder. The virtual responder is configured to determine a real responder based on real responder selection metrics. The virtual responder may poll the real responders at certain times to receive the real responder selection metrics. The virtual responder then selects a real responder from a plurality of real responders based on the real responder's selection metrics. The virtual responder then sends contact information for the selected real responder to the sender device. This allows the sender device to contact the selected real responder to perform the measurement test with a real responder.

Example Embodiments

Figure 1:
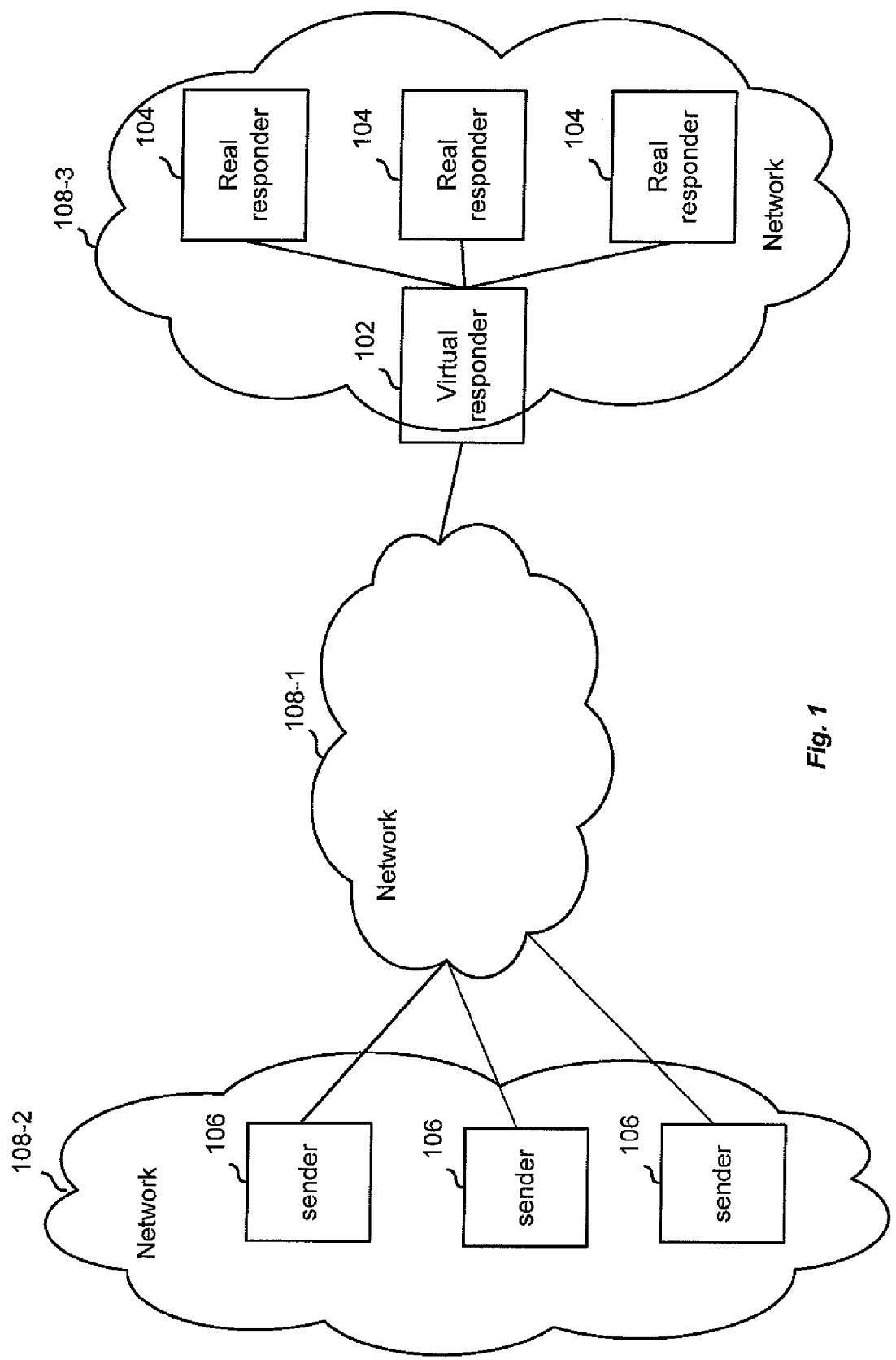
FIG. 1 depicts an example of a system for performing a measurement test using a virtual responder.

FIG. 1 depicts an example of a system for performing a measurement test using a virtual responder. As shown, a virtual responder 102, real responders 104, a senders 106, and networks 108 are provided. It will be understood that any number of the components shown in system 100 may be provided.

Sender 106 may be any device that wants to measure the network performance of a network 108. For example, a measurement test may be performed by sender 106 to measure network performance. A measurement test may involve measuring any kind of network performance for network 108. Specifically, the measurement test may be performed to evaluate service level agreements. In one embodiment, the measurement test may be an Internet Protocol Service Level Agreement (IPSLA) measurement test that measures the network performance of an IP network. IP networks carry data for different types of applications that require networks and the Internet to provide the appropriate level of service for the appropriate application. These include integrated web, voice, video, and business-critical applications. In order to make real-time network decisions that ensure application Quality of Service (QoS), network performance statistics may be measured as data traverses the network. The measurement may be referred to a measurement test. Although an IPSLA test is described, it will be understood that other measurement tests may be performed. For example, the delay or jitter may be measured.

Generally, packet latency is measured by sending a probe packet through network 108 to real responder 104. Real responder 104 tags the probe packet with an arrival time. The probe packet is then sent back to sender 106. If sender 106 had tagged the probe packet with the send time, sender 106 can measure the latency of network 108. That is, the round trip of sending a packet to real responder 104 and receiving the packet. Other measurements may also be measured, such as packet loss, jitter, and packet reordering. For example, packet loss is the number of packets that are lost. Jitter is any variation in intervals between packets sent. Also, packet reordering is when packets are received out of order and need to be reordered. The measurement test may be any test that sends a probe packet to a real responder 104 and receives a response (e.g., the probe packet) back.

Virtual responder 102 is configured to be a central point in which senders 106 can send a control message. The control message may be any message that is associated with a measurement test. For example, the control message may be used to configure the measurement test, such as setting up which real responder 104 should be used, which port, etc. Control messages may be directed to an address for virtual responder 102. Thus, multiple senders 106 may send control messages to the address for virtual responder 102 before contacting real responders 104. Thus, multiple senders 106 may contact virtual responder 102 to determine a real responder 104 that sender 106 can send the probe packet in order to perform the measurement test. Virtual responder 102 may be a router that can respond to the control messages. For example, virtual responder 102 may be composed of real responders 104 or it may be a shadow router, which is a router dedicated for measurement test related actions.

Real responder 104 may be any network device, such as a router, switch, etc., that is forwarding data. Real responder 104 is the device that will perform the measurement test whereas virtual responder 102 responded to the control message to provide which real responder sender 104 should contact. Real responder 104 may incur a forwarding load. This forwarding load may affect the measurement test. When real responder 104 is experiencing a high forwarding load, if a probe packet is received from sender 106 to perform a measurement test, real responder 104 may not be able to provide a response that leads to an accurate measurement test. For example, real responder 104 may not be able to tag the probe packet with the exact arrival time. This may affect the packet latency determined because the latency is measured as the time taken to send the packet through network 108 from sender 106 to real responder 104. Also, probe packets may remain longer in the output queue of real responder 104 after the exiting time was set and tagged in the probe packet. Thus, the time measured to send the packet through network 108 may not be accurate because the probe packet is delayed in the output queue. If these two times are not marked correctly, the accuracy of the measurements will suffer. If the tests are not accurate, a service provider may not be able to determine if the network is performing adequately. This may affect analysis of SLAs and service providers need reliable measurements to ensure service-level agreements are being maintained.

Further, in the case of failures, certain real responders 104 may not be functioning properly or may not be reachable. Thus, having virtual responder 102 select a real responder 104 avoids problems that may occur if real responder 104 cannot be reached. For example, if the sender is hardwired to send measurement tests to a real responder, upon a failure, that sender would not be able to perform the test. However, particular embodiments allow virtual responder 102 to assign a different real responder 104 to respond to the test.

Virtual responder 102 may poll real responders 104 to determine real responder selection metrics. These selection metrics may include the forwarding load of real responders 104 in addition to other metrics, such as memory, health, CPU usage, etc. For example, the memory may be how much free memory real responder 104 has. CPU usage may be how much load the CPU is experiencing. Health may be any errors, failures, or other problems that are being experienced by real responder 104.

Virtual responder 102 may then select a real responder 104 to communicate with sender 106 to perform the measurement test. It is expected that the real responder selected may provide better results for the measurement test than if a real responder 104 that had negative metrics, such as a high forwarding load, was used.

The measurement test measures network performance of networks 108. In one embodiment, the network performance of network 108-1 is measured. In this case, network 108-1 may be a wide area network (WAN). A WAN may mainly influence delay and jitter metrics because a WAN may experience varying conditions (such as bottlenecks, low bandwidth connections, etc.), as opposed to networks 108-2 and 108-3, which include links that are most of the time high-speed and high-bandwidth. Although measuring the network performance of network 108-1 is discussed, it will be understood that the network performance of any network, including a LAN, may be measured using particular embodiments.

Virtual responder 102 may be a router or a group of routers. In one embodiment, virtual responder 102 may be a gateway for network 108-3. Also, virtual responder 102 may be found on a router that is also forwarding data. However, in all cases, senders 106 are configured to send control messages to virtual responder 102 first to determine a real responder 104.

Virtual responder 102 is then configured to respond to sender 106 with contact information for a real responder 104. Thus, senders 106 do not need to be configured to be able to connect to real responders 104 first. This may involve extensive configuration of sender 106. Rather, virtual responder 102 provides contact information to sender 106. This also provides a single contact for senders 106 to initiate control messages. Thus, if failures occur for some of the real responders 104, as long as sender 106 can contact virtual responder 102, a real responder 104 can be selected that can respond to sender 106.

Once receiving the contact information, sender 106 may perform the measurement test. For example, a probe packet may be sent to the selected real responder 104, which then responds. A measurement may then be determined from the response.

Figure 2:
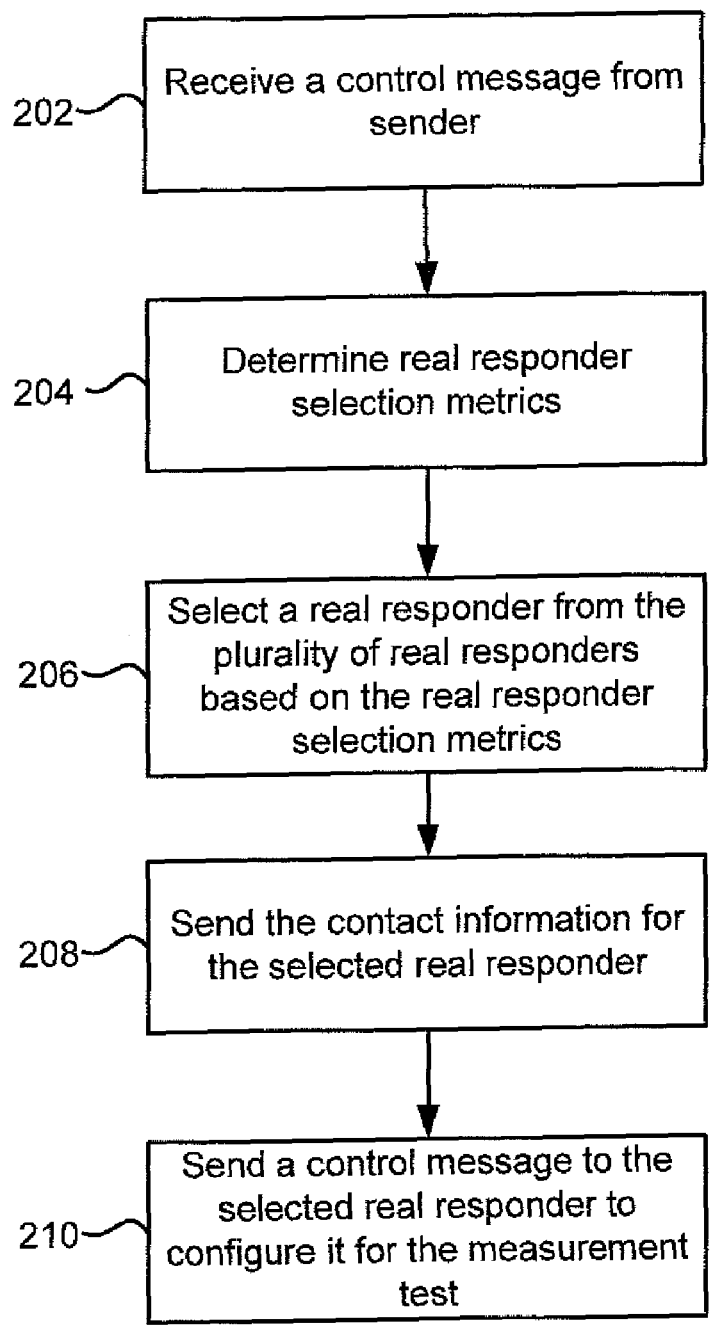
FIG. 2 depicts an example of a method for responding to a request from a sender at a virtual responder.

FIG. 2 depicts an example of a method for responding to a request from sender 106 at virtual responder 102. Step 202 receives a control message from sender 106. For example, all senders 106 may be configured to send the initial control message to virtual responder 102. The control message may be connected to an IP address for virtual responder 102. For example, the IP address may be London-POP, which may be a post office protocol address for a location in London. For example, the London-POP address may be for a location associated with network 108-3.

Figure 3:
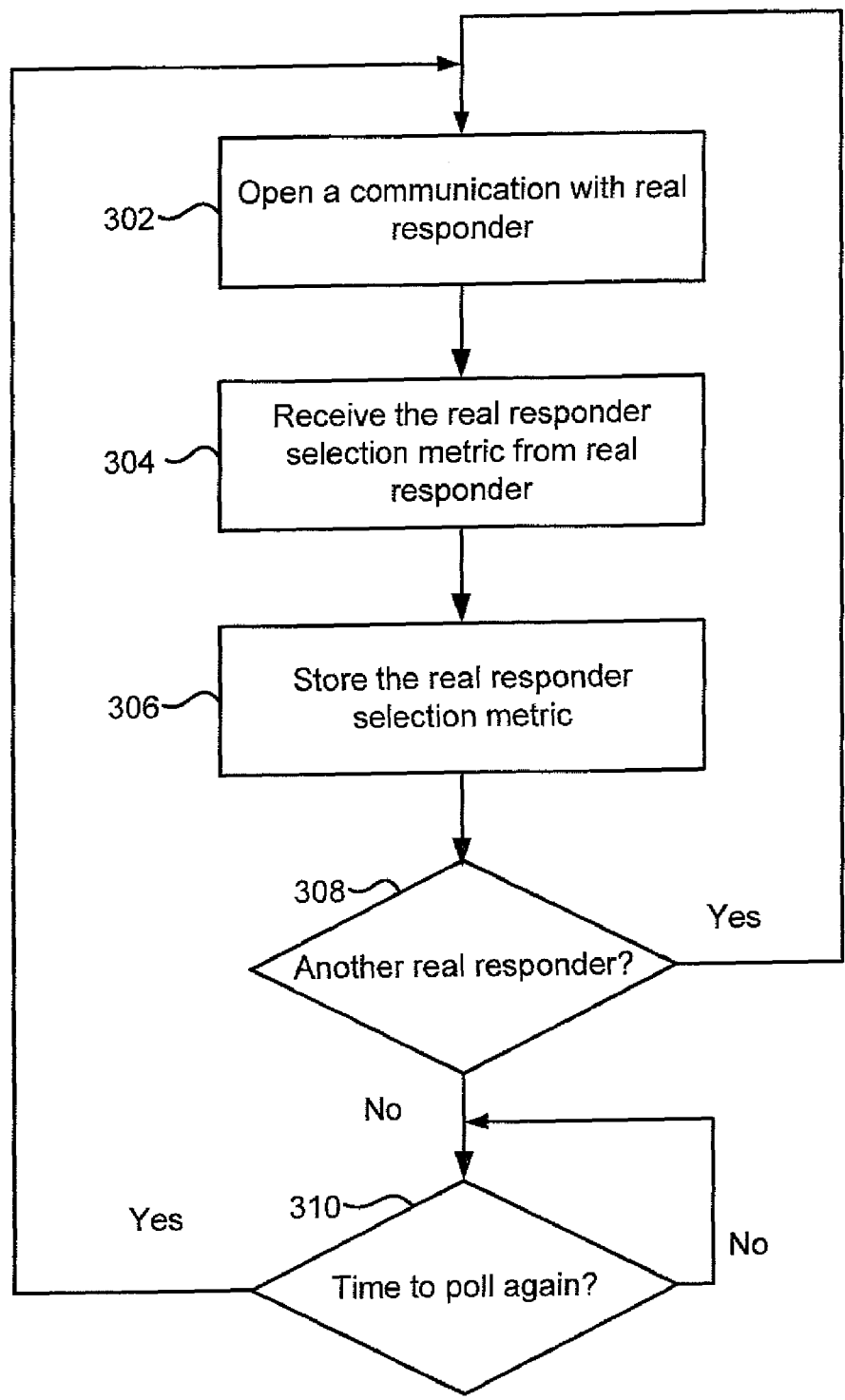
FIG. 3 depicts an example of a method for polling real responders.

Step 204 determines real responder selection metrics. The real responder selection metrics may be discovered by polling real responders 104. For example, FIG. 3 depicts an example of a method for polling real responders 104. Step 302 opens a communication with real responder 104. The communication may include a simple network management protocol (SNMP) request. This may involve accessing the real responder selection metrics through SNMP, such as via a read community if it is available via SNMP. SNMP is a set of rules that allows a computer to get statistics from another computer. Real responders 104 may keep track of various statistics that measure what they are doing. For example, routers can keep track of the forwarding load including the number of bytes, packets, and errors that were transmitted and received on each interface (port). Each of these pieces of information is kept in a database described by a Management Information Base (MIB), which can be accessed using SNMP. A read community is like a password that allows read access to virtual responder 102.

Also, the real responder selection metrics may be determined via extensible markup language-programmatic interface (XML-PI) or any other programmatic interface that allows virtual responder 102 to access information for real responder 104. Also, an extension to the IPSLA control protocol may be used. In this case, a modified message may be sent to real responder 104 that can be responded to and used to determine the real responder selection metric. For example, the forwarding load may be determined by sending a control message to real responder 104 and receiving a response back. Using the modified control message may not use as many resources as performing a measurement test because the forwarding load may just need to be determined instead of marking a probe packet, and forwarding it back to sender 106. For example, a message is sent to real responder 104, which responds with the forwarding load. A packet does not need to be processed, queued, and resent in this case.

Step 304 receives the real responder selection metrics from real responder 104. Step 306 then stores the real responder selection metric. The real responder selection metrics may be indexed by each real responder 104. Thus, real responder selection metrics for each real responder 104 may be stored.

Step 308 then determines if another real responder 104 should be contacted. If so, the process reiterates to step 302 where the next real responder 104 is contacted to determine the real responder selection metrics.

Step 310 then determines if there is time to poll real responders 104 again. For example, real responders 104 may not be polled continuously. It may be desirable to reduce the load on real responders 104. For example, if a real responder 104 has a high forwarding load, it would be desirable not to assign it to sender 106 to respond to a measurement test. Similarly, it may not be desirable to overload it with requests for real responder selection metrics. In one embodiment, the polling of real responders 104 for real responders selection metrics uses less CPU usage than having real responder 104 respond to the probe packets. Thus, the polling when performed at certain intervals, such as every minute, is efficient and does not use significant CPU processing power at real responders 104.

Referring back to FIG. 2, step 206 selects a real responder 104 from the plurality of real responders 104 based on the real responder selection metrics. The selection may be based on different factors. For example, the real responder with the lowest forwarding load may be selected. However, other information may also be used, such as the amount of free memory, etc., may also be used in selecting real responder 104. The algorithm used may select what is considered the best available real responder.

Step 208 sends the contact information for the selected real responder 104. The contact information may be an IP address for real responder 104. Also, other methods may be used, such as an identifier for real responder 104 may be sent and sender 106 may then look up the identifier in a table to determine the IP address or other information needed to contact real responder 104. Thus, the real responder 104 is automatically and dynamically determined. As conditions change, different real responders 104 may be assigned to different senders 106.

Step 210 then sends a control message to the selected real responder 104 to configure it for the measurement test. For example, the control message may request the opening of a port, resetting of counters (e.g., the receive and transmit sequence numbers), verifying the authentication (authentication shared key) for sender 106, etc. Also, the IP address for sender 106 may also be specified. Other information may also be provided to the selected real responder 104 to prepare it for the measurement test. Once the real responder 104 is determined, then the measurement test phase may begin.

Figure 4:
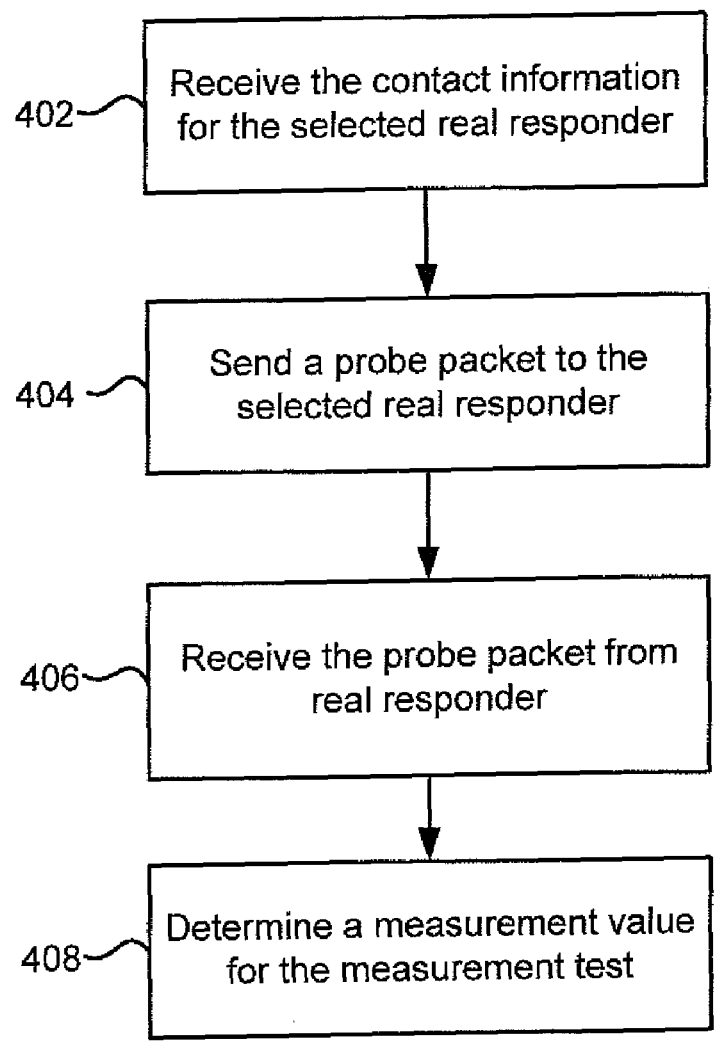
FIG. 4 depicts an example of a method for performing a measurement test using the sender according to one embodiment.

FIG. 4 depicts an example of a method for performing a measurement test using sender 106 according to one embodiment. Step 402 receives the contact information for the selected real responder 104. For example, the IP address may be received for real responder 104. The contact information is received after sender 106 sent a control message to virtual responder 102 as described above.

The measurement test is known and although the following is being described for discussion purposes and clarity, it will be understood that other measurement tests may be performed. Step 404 then sends a probe packet to the selected real responder 104. Accordingly, virtual responder 102 may not be contacted to perform the measurement test after receiving the contact information. Rather, the probe packet is sent directly from sender 106 to the selected real responder 104. In one example, the probe packet may be stamped with a sent time by sender 106.

Step 406 receives the probe packet from real responder 104. Real responder 104 may tag the probe packet with an arrival time for when the probe packet was received at real responder 104. Also, the exit time may be tagged in the probe packet for when real responder 104 sends the probe packet. Also, other information may have been inserted in the probe packet, such as number of packets being reordered, lost, etc.

Step 408 then determines a measurement value for the measurement test. For example, the latency of the network may be determined. For example, the sent time by sender 106 and the arrival time at real responder 104 are used to determine how long the packet took to traverse network 108. Also, the sent time from real responder 104 and the arrival time at sender 106 are used to determine the return time for network 108. A round trip time may then be determined and used to gauge network performance, that is, how long a roundtrip took to send a packet through network 108. Other network performance metrics may also be determined, such as packet loss, jitter, number of packets being reordered, etc.

If during the test phase, the forwarding load changes in the routers, a new selection may be made. In this case, a new real responder 104 may be selected and the contact information is sent to sender 106. If the previous selected real responder cannot respond, the open connection may time out and be closed.

Figure 5:
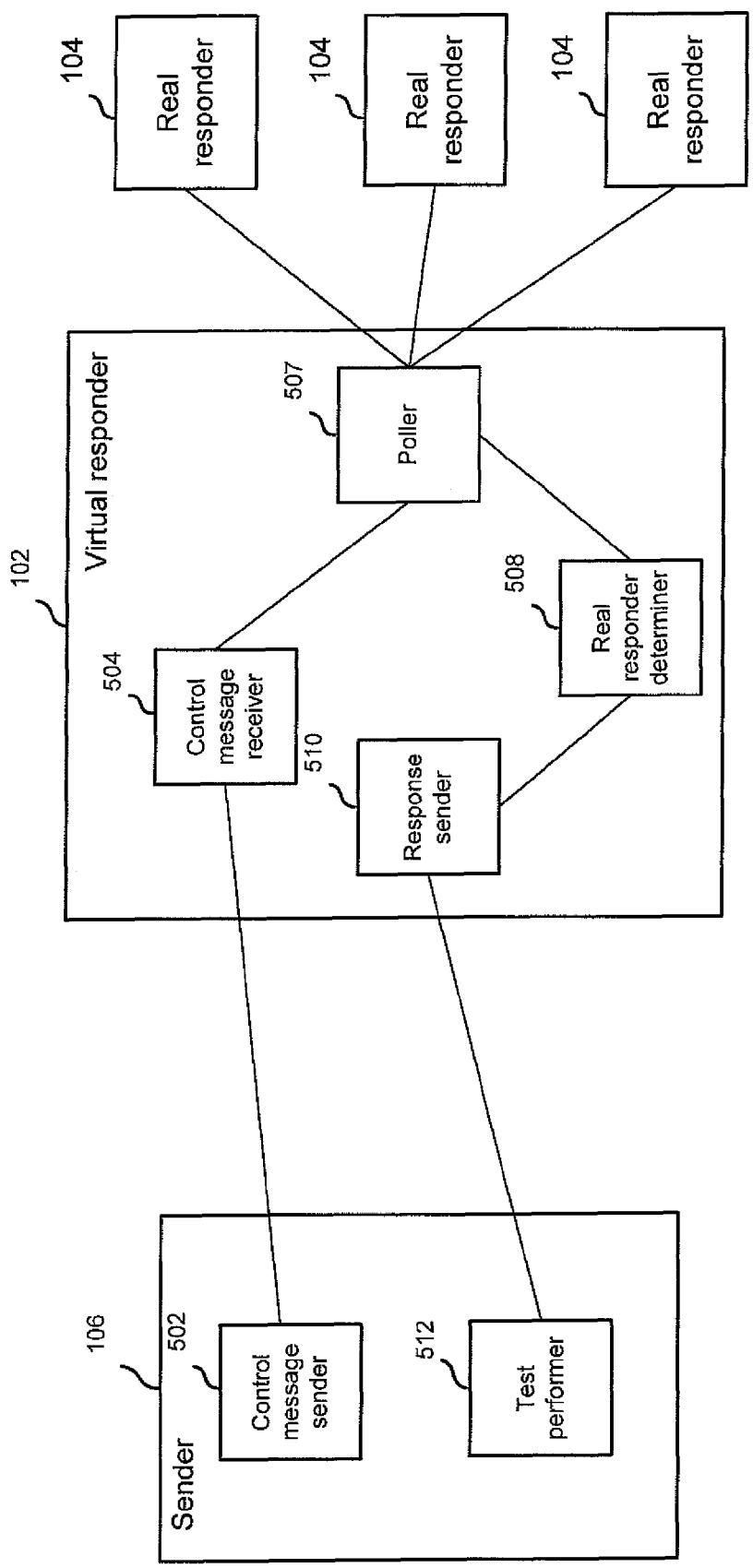
FIG. 5 depicts a more detailed example of the system depicted in FIG. 1.

FIG. 5 depicts a more detailed example of the system depicted in FIG. 1. As shown, sender 106 includes a control message sender 502 that is configured to send a control message to virtual responder 102. A control message receiver 504 receives the control message.

A poller 507 is configured to poll real responders 104 for real responder selection metrics. For example, at certain times, communication is opened with real responders 104 to determine the real responder selection metrics. These metrics may be stored.

A real responder determiner 508 is configured to select a real responder 104 based on the selection metrics. For example, as described above, the real responder with the lowest forwarding load may be selected.

A response sender 510 then sends a response to sender 106 including contact information for the selected real responder. Also, control message sender 510 sends a configuration message to the selected real responder 104 to configure it for a measurement test.

A test performer 512 of sender 106 receives the contact information and is configured to contact the selected real responder 104. The selected real responder 104 is contacted directly instead of going through virtual responder 102. The measurement test may then be performed between sender 106 and the selected real responder 104.

Particular embodiments provide many advantages. For example, the accuracy of a measurement test may be directly influenced by the forwarding load or other metrics on a real responder 104. Accordingly, particular embodiments select the real responder 104 that is considered to have the best chance of providing an accurate measurement test. For example, the real responder with the lowest forwarding load may be able to provide the most accurate measurement test. This may provide better measurements specifically in the case of troubles, such as network failures, router failures, router problems, etc.

Although the description has been described with respect to particular embodiments thereof, these particular embodiments are merely illustrative, and not restrictive. Although routers are described, it will be understood that any network devices may be used.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing. Functions can be performed in hardware, software, or a combination of both. Unless otherwise stated, functions may also be performed manually, in whole or in part.

In the description herein, numerous specific details are provided, such as examples of components and/or methods, to provide a thorough understanding of particular embodiments. One skilled in the relevant art will recognize, however, that a particular embodiment can be practiced without one or more of the specific details, or with other apparatus, systems, assemblies, methods, components, materials, parts, and/or the like. In other instances, well-known structures, materials, or operations are not specifically shown or described in detail to avoid obscuring aspects of particular embodiments.

A "computer-readable medium" for purposes of particular embodiments may be any medium that can contain and store the program for use by or in connection with the instruction execution system, apparatus, system, or device. The computer-readable medium can be, by way of example only but not by limitation, a semiconductor system, apparatus, system, device, or computer memory.

Particular embodiments can be implemented in the form of control logic in software or hardware or a combination of both. The control logic, when executed by one or more processors, may be operable to perform that which is described in particular embodiments.

A "processor" or "process" includes any hardware and/or software system, mechanism or component that processes data, signals, or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", "a specific embodiment", or "particular embodiment" means that a particular feature, structure, or characteristic described in connection with the particular embodiment is included in at least one embodiment and not necessarily in all particular embodiments. Thus, respective appearances of the phrases "in a particular embodiment", "in an embodiment", or "in a specific embodiment" in various places throughout this specification are not necessarily referring to the same embodiment. Furthermore, the particular features, structures, or characteristics of any specific embodiment may be combined in any suitable manner with one or more other particular embodiments. It is to be understood that other variations and modifications of the particular embodiments described and illustrated herein are possible in light of the teachings herein and are to be considered as part of the spirit and scope.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated particular embodiments, including what is described in the Abstract, is not intended to be exhaustive or to limit the invention to the precise forms disclosed herein. While specific particular embodiments of, and examples for, the invention are described herein for illustrative purposes only, various equivalent modifications are possible within the spirit and scope, as those skilled in the relevant art will recognize and appreciate. As indicated, these modifications may be made to the present invention in light of the foregoing description of illustrated particular embodiments and are to be included within the spirit and scope.

Thus, while the present invention has been described herein with reference to particular embodiments thereof, a latitude of modification, various changes and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit. It is intended that the invention not be limited to the particular terms used in following claims and/or to the particular embodiment disclosed as the best mode contemplated for carrying out this invention, but that the invention will include any and all particular embodiments and equivalents falling within the scope of the appended claims.

We claim:

1. A method for a measurement test related to measuring network performance, comprising:
   accessing performance statistics that are tracked by one or more responders and the performance statistics include selection metrics;
   receiving, at a virtual responder, accessed real responder selection metrics from polling of the one or more real responders;
   storing, at the virtual responder, the real responder selection metrics received from the one or more real responders;
   receiving, at the virtual responder, a first control message that is associated with a measurement test for measuring network performance by a sender device;
   in response to receiving the first control message, using the virtual responder to determine an available real responder from among the one or more real responders to perform the measurement test for measuring network performance associated with the first control message, wherein the determination of the available real responder is based on the stored real responder selection metrics;
   selecting, at the virtual responder, the available real responder from the one or more real responders;
   based on the selecting of the available real responder, sending contact information of the selected real responder from the virtual responder to the sender device; and sending, to the selected real responder by the virtual responder, a second control message, that includes information to configure the selected real responder to have the measurement test for measuring network performance by the sender device.

2. The method of claim 1, wherein the polling of the one or more real responders further comprises:
   sending a metric request message to each of the one or more real responders; and
   receiving a metric response message from each of the one or more real responders indicating at least one real responder selection metric.

3. The method of claim 2, wherein the metric request message and the metric response message are sent through simple network management protocol (SNMP), extensible markup language-programmatic interface (XML-PI), or a modified control protocol.

4. The method of claim 1, wherein the available real responder selection metrics comprises a metric associated with a forwarding load for at least one real responder.

5. The method of claim 4, wherein selecting the real responder comprises selecting one real responder out of the one or more real responders that has a lowest forwarding load.

6. The method of claim 1, wherein sending the contact information comprises sending an Internet Protocol (IP) address of the selected real responder.

7. The method of claim 1, further comprising:
   receiving, at the virtual responder, a plurality of control messages from a plurality of sender devices; and
   for each control message, performing the following by the virtual responder:
      determining at least one available real responder from the one or more real responders, wherein the determination of the at least one available real responder is based on the real responder selection metrics stored at the virtual responder;
      selecting one available real responder from the one or more real responders; and
      based on selecting the available real responder, sending contact information of the selected real responder to respective sender device, wherein different real responders are selected for different sender devices based on the stored real responder selection metrics.

8. A method, comprising:
   sending, from a sender device, a control message to a virtual responder, wherein the control message is associated with a measurement test for measuring network performance by the sender device;
   receiving, by the sender device, a response message from the virtual responder, the response message including information associated with an identity of a real responder that was selected by the virtual responder from a plurality of real responders to perform the measurement test for measuring network performance, the selected real responder being determined by the virtual responder based on real responder selection metrics, wherein the real responder selection metrics are obtained from a database at the virtual responder, and wherein the virtual responder is configured for polling each of the plurality of real responders to access performance statistics that are tracked by each real responder;
   determining, by the sender device, contact information for the selected real responder based on the information included in the response message received from the virtual responder; and
   sending, by the sender device, a probe packet to the selected real responder to perform the measurement test for measuring network performance with the selected real responder, wherein the measurement test is performed by the selected real responder without contacting the virtual responder.

9. The method of claim 8, further comprising receiving, by the sender device and in response to sending the probe packet to the selected real responder, a modified probe packet from the selected real responder, wherein information included in the modified probe packet is used to determine at least one measurement for the measurement test.

10. The method of claim 8, wherein the sender device contacts the virtual responder only to receive the contact information for the selected real responder from the plurality of real responders to perform the measurement test.

11. An apparatus, comprising:
    one or more processors; and
    logic encoded in one or more non-transitory storage media for execution by the one or more processors and when executed perform operations:
       access performance statistics that are tracked by one or more real responders and the performance statistics include selection metrics;
       receive, at a virtual responder, accessed real responder selection metrics from polling of the one or more real responders;
       store, at the virtual responder, the real responder selection metrics received from the one or more real responders;
       receive, at the virtual responder, a first control message that is associated with a measurement test for measuring network performance by a sender device;
       in response to receiving the first control message, invoke the virtual responder to determine an available real responder from among the one or more real responders to perform the measurement test for measuring network performance associated with the first control message, wherein the determination of the available real responder is based on the stored real responder selection metrics;
       selecting, at the virtual responder, the available real responder from the one or more real responders;
       based on the selecting of the available real responder, send contact information of the selected real responder from the virtual responder to the sender device; and
       send, to the selected real responder by the virtual responder, a second control message, that includes information to configure the selected real responder to have the measurement test for measuring network performance by the sender device.

12. The apparatus of claim 11, wherein the logic when executed is further operable to:
    send a metric request message to each of the one or more real responders; and
    receive a metric response message from each of the one or more real responders indicating at least one real responder selection metric.

13. The apparatus of claim 12, wherein the metric request message and the metric response message are sent through simple network management protocol (SNMP), an extensible markup language-programmatic interface (XML-PI), or a modified control protocol.

14. The apparatus of claim 11, wherein the real responder selection metrics comprises a metric associated with a forwarding load at a real responder.

15. The apparatus of claim 14, wherein logic operable to select a real responder comprises logic that when executed is further operable to select a real responder that has a lowest forwarding load out of the one or more real responders.

16. The apparatus of claim 11, wherein logic operable to send the contact information comprises logic that when executed is further operable to send an Internet Protocol (IP) address of the selected real responder.

17. The apparatus of claim 11, wherein the logic when executed is further operable to:
receive, at the virtual responder, a plurality of control messages from a plurality of sender devices; and
for each control message, performing the following by the virtual responder:
determine at least one available real responder from the one or more real responders, wherein the determination of the at least one available real responder is based on the real responder selection metrics stored at the virtual responder;
select one available real responder from the one or more real responders; and
based on selecting the available real responder, send contact information of the selected real responder to respective sender device wherein different real responders are selected for different sender devices based on the stored real responder selection metrics.

18. An apparatus, comprising:
one or more processors; and
logic encoded in one or more non-transitory storage media for execution by the one or more processors and when executed perform operations to:
send, from a sender device, a control message to a virtual responder, wherein the control message is associated with a measurement test for measuring network performance by the sender device;
receive, by the sender device, a response message from the virtual responder, the response message including information associated with an identity of a real responder that was selected by the virtual responder from a plurality of real responders to perform the measurement test for measuring network performance, the selected real responder being determined by the virtual responder based on real responder selection metrics, wherein the real responder selection metrics are obtained by the virtual responder and stored in a database by polling each of the plurality of real responders to access performance statistics that are tracked by each real responder;
determine, by the sender device, contact information of the selected real responder based on the information included in the response message received from the virtual responder; and
send, by the sender, a probe packet to the selected real responder to perform the measurement test for measuring network performance with the selected real responder, wherein the measurement test is performed by the selected real responder without contacting the virtual responder.

19. The apparatus of claim 18, wherein the logic when executed is further operable to send, by the sender device and in response to sending the probe packet to the selected real responder, a modified probe packet from the selected real responder, wherein information included in the modified probe packet is used to determine at least one measurement for the measurement test.

20. The apparatus of claim 18, wherein the sender device contacts the virtual responder only to receive the contact information for the selected real responder from the plurality of real responders to perform the measurement test.

21. A non-transitory computer-readable storage medium including instructions for execution by one or more processors, and when executed perform operations to:
receive, at a virtual responder, a first control message from a sender device, wherein the first control message is associated with a measurement test of measuring network performance;
determining, by the virtual responder, real responder selection metrics from a plurality of real responders by polling each of the plurality of real responders to access performance statistics that are tracked by each real responder and stored in a database, the real responder selection metrics comprising one or more metrics used for selected the plurality of real responders;
determine, by the virtual responder, an available real responder from the plurality of real responders to perform the measurement test for measuring network performance indicated by the first control message, wherein the determination of the available real responder is based on the real responder selection metrics stored at the virtual responder;
selected, by the virtual responder, the available real responder from the plurality of real responders;
based on selecting the available real responder, send, by the virtual responder, contact information of the selected real responder to the sender device; and
send, by the virtual responder, a second control message to the selected real responder, the second control message comprising information to configure the selected real responder to have the measurement test for measuring network performance by the sender device.

* * * * *